UNITED STATES PATENT OFFICE.

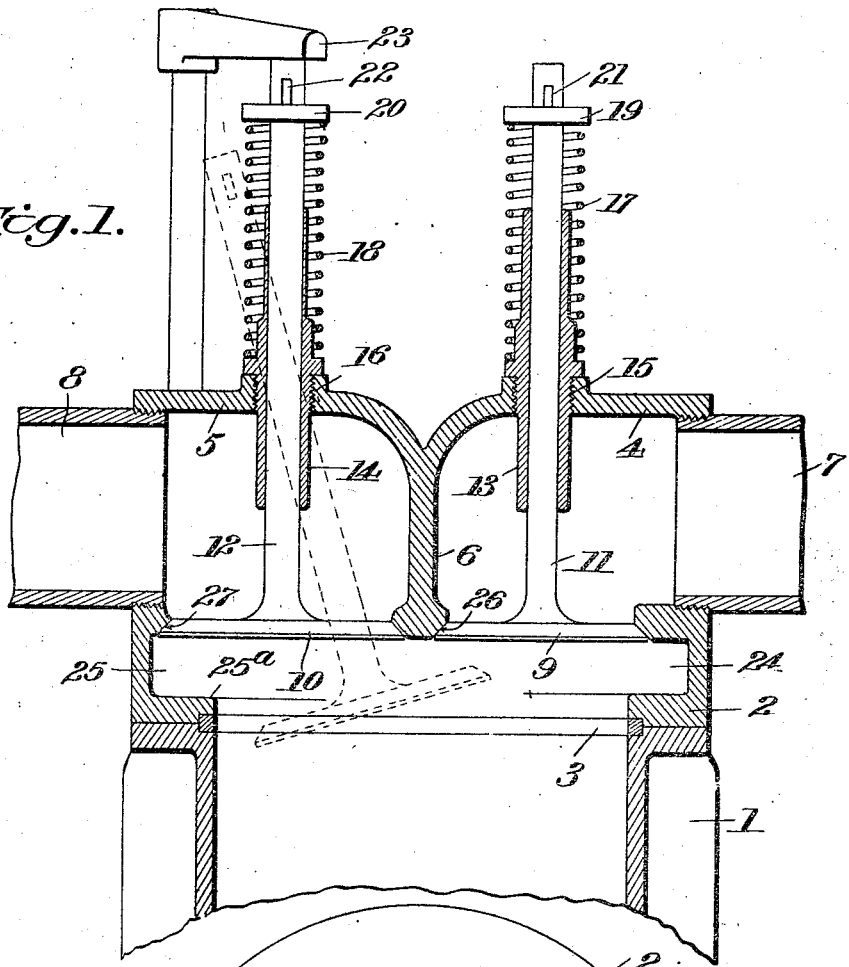

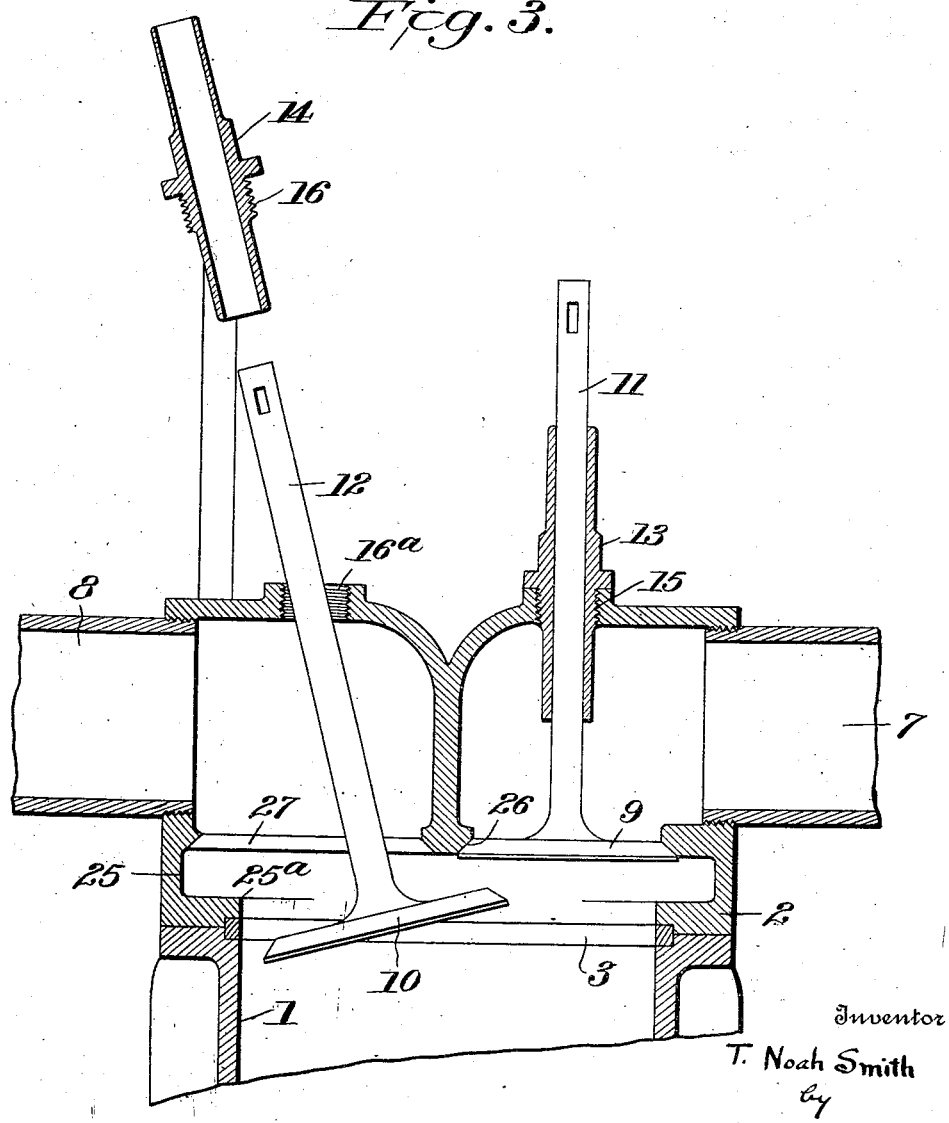

THOMAS NOAH SMITH, OF SAN ANGELO, TEXAS.

VALVE CONSTRUCTION.

1,255,806.

Specification of Letters Patent. Patented Feb. 5, 1918.

Application filed March 13, 1916. Serial No. 83,888.

*To all whom it may concern:*

Be it known that I, THOMAS NOAH SMITH, a citizen of the United States, residing at San Angelo, in the county of Tom Green and State of Texas, have invented certain new and useful Improvements in Valve Constructions, of which the following is a specification.

This invention relates to internal combustion engines, and its primary object is to provide a simple construction in which relatively large inlet and exhaust valves may be employed.

In engines of this character, and especially those high speed engines usually employed for driving motor vehicles, it is of the utmost importance that the valves have ample capacity, so as not to obstruct the flow of gases. It is also desirable that the valves be removable inwardly, and thus avoid the necessity for complicated valve cages or boxes set into the outer wall of the cylinder head, as has heretofore been proposed. My improved construction also permits a free, direct, and unobstructed passage from the valves through the intake and exhaust pipes.

In order that the invention may be readily understood, reference is had to the accompanying drawings, forming part of this specification, and in which:

Figure 1 is a longitudinal section through the upper part of the cylinder and the cylinder head, showing my improved valves in position therein;

Fig. 2 is an inverted plan view of the cylinder head, showing the valves; and,

Fig. 3 is a view similar to Fig. 1, showing the method of removing and assembling the valve parts.

Referring to the drawings in detail, 1 designates the usual cylinder and 2 the cylinder head. These may be united in any suitable way, the joint being preferably sealed by means of a gasket 3.

The cylinder head is divided by a partition wall 6 into two tubular chambers, the outer walls of which are designated by the reference characters 4 and 5. The inlet pipe 7 communicates directly with the chamber 4, and the exhaust pipe 8 is connected with the chamber 5.

The inlet valve is indicated at 9, and the exhaust valve at 10, these valves being of the usual mushroom type, and carried by stems 11 and 12, respectively.

The stems 11 and 12 extend snugly through guides 13 and 14, respectively, these guides being screw threaded at 15 and 16 and being set into similarly screw threaded openings in the walls 4 and 5 of the cylinder head, one of such openings being clearly shown at 16ª in Fig. 3. It will be noted that these guides 13 and 14 are relatively long and extend to a considerable distance on both sides of the walls 4 and 5, so as to accurately hold the valves in position and insure their proper axial movement.

Helical springs 17 and 18 surround the valve stems 11 and 12, respectively, said springs bearing at one end against the respective guides 13 and 14, and at the other end against collars 19 and 20, which are secured to the valve stems as by means of keys 21 and 22. The valves may be actuated by any suitable mechanism, the usual tappet being indicated at 23.

It will be noted that the combined diameter of the valves 9 and 10 is considerably greater than the inside diameter of the cylinder head or bore. This large size of the valves is made possible by forming pockets 24 and 25 in the side walls of the cylinder head inside of the valves, such pockets extending laterally beyond the outline of the cylinder bore, as clearly shown in Fig. 2. The outward movement of the valves 9 and 10 is limited by the seats 26 and 27 (see Fig. 3), against which they close, while their inward movement is limited by the shoulders 25ª, formed at the inner edge of the pockets. Thus, it will be seen that the valves are normally confined within the pockets 24 and 25 which partially surround them. It will be further noted that the cylinder head can be removed entirely without in any way disturbing the mounting of these valves. If, during the operation of the engine, the valve stems should break, the valves will lodge upon the shoulders, such as 25ª, and thus be prevented from falling down into the bore of the cylinder.

Fig. 3 shows the method by which the valves are assembled in the cylinder head. The springs and guide tubes are removed, and the stem, such as 12, is inserted from the inside up through the screw threaded opening 16ª. This opening is of such size as to permit considerable play of the valve stem, so that it is possible to bring the valve 10 up into position against the seat 27 without difficulty. The guide 14 is then slipped over the upper end of the stem 12 and screwed into position in the opening 16ª, in the same manner as illustrated by the guide 13 in Fig. 3. The spring can then be placed in position over the guide and the collar and key assembled so that the tension of the spring maintains the valve closed.

When it is desired to remove the valves, the reverse proceeding is, of course, followed. The spring having been taken off, the guide tube is then unscrewed and withdrawn. This permits the valve to be swung laterally, as indicated in dotted lines in Fig. 1, so as to clear the shoulder 25ª, and it may then be removed. What has been said in regard to the valve 10 applies equally, of course, to the valve 9.

By virtue of the improved construction above described, it is possible to employ valves of any size necessary to operate efficiently at high speed, and it will be noted that there are clear open passages connecting the valves with the intake and exhaust pipes, respectively, such passages being obstructed only by the relatively small valve stems.

What I claim is:

1. The combination with an engine cylinder having a head, of a valve and valve stem mounted in the head and movable axially of the cylinder, a shoulder between the valve and cylinder bore normally acting as a stop to limit the inward movement of said valve, said cylinder head having an opening smaller than the valve, and a relatively long removable guide for the valve stem secured in said opening and having a relatively short bearing therein, whereby, when said guide is removed, the valve stem may be tilted laterally in said opening, so as to cause the valve to clear said shoulder.

2. The combination with an engine cylinder having a removable head, of a valve and stem mounted in the head and movable axially of the cylinder, a shoulder carried by said head normally acting as a stop to limit the inward movement of said valve, said cylinder head having an opening smaller than the valve, and a removable guide for the valve stem secured in said opening, whereby, when said guide is removed, the valve stem may be swung laterally, so as to cause the valve to clear said shoulder.

In testimony whereof I have affixed my signature.

T. NOAH SMITH.